US007389603B1

(12) United States Patent
Brumfield

(10) Patent No.: US 7,389,603 B1
(45) Date of Patent: Jun. 24, 2008

(54) MODULAR SIGN POST

(76) Inventor: Donald U. Brumfield, 17000 Granite Falls Way, Chowchilla, CA (US) 93610

( * ) Notice: Subject to any disclaimer, the term of this patent is extended or adjusted under 35 U.S.C. 154(b) by 0 days.

(21) Appl. No.: 11/752,852

(22) Filed: May 23, 2007

(51) Int. Cl.
*G09F 15/02* (2006.01)
*G09F 15/00* (2006.01)
*A45F 3/44* (2006.01)
*F16M 13/00* (2006.01)
*A47G 29/00* (2006.01)
*A47F 5/00* (2006.01)
*B25D 9/00* (2006.01)

(52) U.S. Cl. ..................... 40/607.05; 248/156; 248/530; 248/545; 248/370; 248/125.8; 173/91

(58) Field of Classification Search ................ 40/607.1, 40/607.01–607.09, 608, 606.18, 611.01, 40/606.01, 611.05; 248/156, 530, 545, 370, 248/125.8; 173/91
See application file for complete search history.

(56) References Cited

U.S. PATENT DOCUMENTS 4,357,772 A 11/1982 Amick et al.
5,903,991 A 5/1999 Sasse
6,910,664 B2 * 6/2005 Bolinder et al. ............ 248/156
7,036,255 B1 * 5/2006 Santana et al. ........... 40/607.09
7,089,694 B2 * 8/2006 Allen ...................... 40/607.04
D554,192 S * 10/2007 Gollob ....................... D20/41
2006/0016111 A1 1/2006 Simmons
2006/0101690 A1 5/2006 Terbet, Jr.

* cited by examiner

*Primary Examiner*—Lesley D. Morris
*Assistant Examiner*—Syed A Islam
(74) *Attorney, Agent, or Firm*—Schneck & Schneck; Thomas Schneck; David M. Schneck

(57) ABSTRACT

A modular signpost including a first section, a second section that mounts onto the first section, and a third section that mounts onto the second section. The first section includes a ground mounting structure, a base tube and a guide tube. The second section includes a bracket for holding a flyer box. The second section includes a body tube that is able to slide over the guide tube on the first section. The third section is slide fit into the second section.

7 Claims, 3 Drawing Sheets

MODULAR SIGN POST

TECHNICAL FIELD

The present invention relates generally to sign posts and more particular to a sign post which is modular, made to assemble from multiple sections, and can be reassembled and mounted in the ground without the use of additional tools.

BACKGROUND OF THE INVENTION

In real estate and a number of other fields it is very useful to have a sign post for indicating information (e.g., that a property is for sale) to the public in a conspicuous manner. Commonly the signs currently in use are usually manufactured of 4×4 lumber sections joined to form a vertical post and horizontal top arm. The signs hang from the bottom of the horizontal arm and additional banners may be placed on top of the horizontal arm. For example, the name of the real estate company and agent may be positioned on S-hooks below the horizontal arm (mounted on a ring or hook secured into the horizontal arm) while “sale pending” or other sale information may be placed at the top of the horizontal arm. A flyer box is commonly nailed or otherwise secured to one side of the vertical post facing the street or the area accessed by viewers. This flyer box allows those viewing the sign post to approach the sign post and take away a flyer. The flyer provides printed information about the property being sold or other useful information.

The 4×4 lumber sign posts are rather heavy and bulky to transport and challenging to install and remove. Professional installers are commonly used to install and remove signs. This creates additional cost and causes a delay in placing the sign.

More recently arm post signs have been manufactured from lighter gauge metal square tubing and plastic (e.g., PVC) square tubing. These sign posts have been installed by digging holes and setting the vertical section into place in the hole or driving iron stakes through a holding bracket or tubing which is in turn attached to the vertical post. To mount any of these devices into the ground generally requires a number of different tools for the installation of the sign. These may include a shovel or other digging tool to create a hole into which the vertical pole is placed or any hammer or other striking tool for the installation of the post into the ground. Some signs have been designed requiring a specialty tool.

An alternative to a large, heavy monolithic device is the use of an arm post sign which may be disassembled. Such devices generally require some assembly hardware such as bolts or screws, to secure the various parts or sections of the signs together. Commonly end caps are installed to cap the ends of the sign posts to create a more natural and attractive appearance.

An object of the Applicant is to provide a less bulky arm sign which can be transported and installed by an individual user, such as a real estate agent. As a further object that this device sections may be used for installing the sign such that additional tools are not necessary for either installing the sign or removing the sign.

SUMMARY OF INVENTION

The present modular sign post includes a first sign section which is mounted into the ground, a second sign section which is mounted on the first sign section, and a top arm section onto which a hanging sign may be mounted. The first sign section includes a base plate having a plurality of stakes extending from one side. In one embodiment, three stakes are used, the central stake being longer than the two flanking side stakes. On the opposite side of the base plate, a base tube is mounted. Mounted within the base plate is a guide tube. This guide tube extends into the base tube and beyond one end of the base tube. At the apex of the base tube is mounted a driving stop collar which forms an annular ring about the guide tube which extends beyond the end of the base tube. The second sign section includes a body tube having a cross-sectional interior dimension such that the guide tube may slidably fit into the body tube. A driving collar is mounted at a first end of the body tube. A flyer box mount is attached to the body tube. When the first section is placed such that the end of the stakes are pointing into the ground, the second section may be mounted over the first section and raised and lowered such that the driving collar repeatedly strikes the driving stop collar. Relatively little force is required to raise and lower this second section. This force would act to drive the stakes into the ground. Once the first sign section is mounted into the ground and the second sign section is mounted over the first a third sign section may be mounted over the second sign section. The third sign section includes a top vertical tube having a cross-sectional dimension allowing the tube to be mounted into the inner bore second tube. Mounted on this top vertical tube is an upper horizontal arm and a lower horizontal arm. The lower horizontal arm is mounted onto the top vertical tube such that it is parallel to the upper horizontal arm for most of its length. Proximate to one end of the lower arm, the arm bends and is connected to the upper horizontal arm.

The device may include a number of additional features. These may include a face plate mounted on the base plate in front of an upper portion of the stakes, a rotatably attached flyer box mount, multiple drift stops on the lower horizontal arm to constrain the movement of the hardware for hanging a sign, and inline tabs on an upper surface of the upper horizontal arm to allow mounting of additional signs.

DETAILED DESCRIPTION

Figure 1:
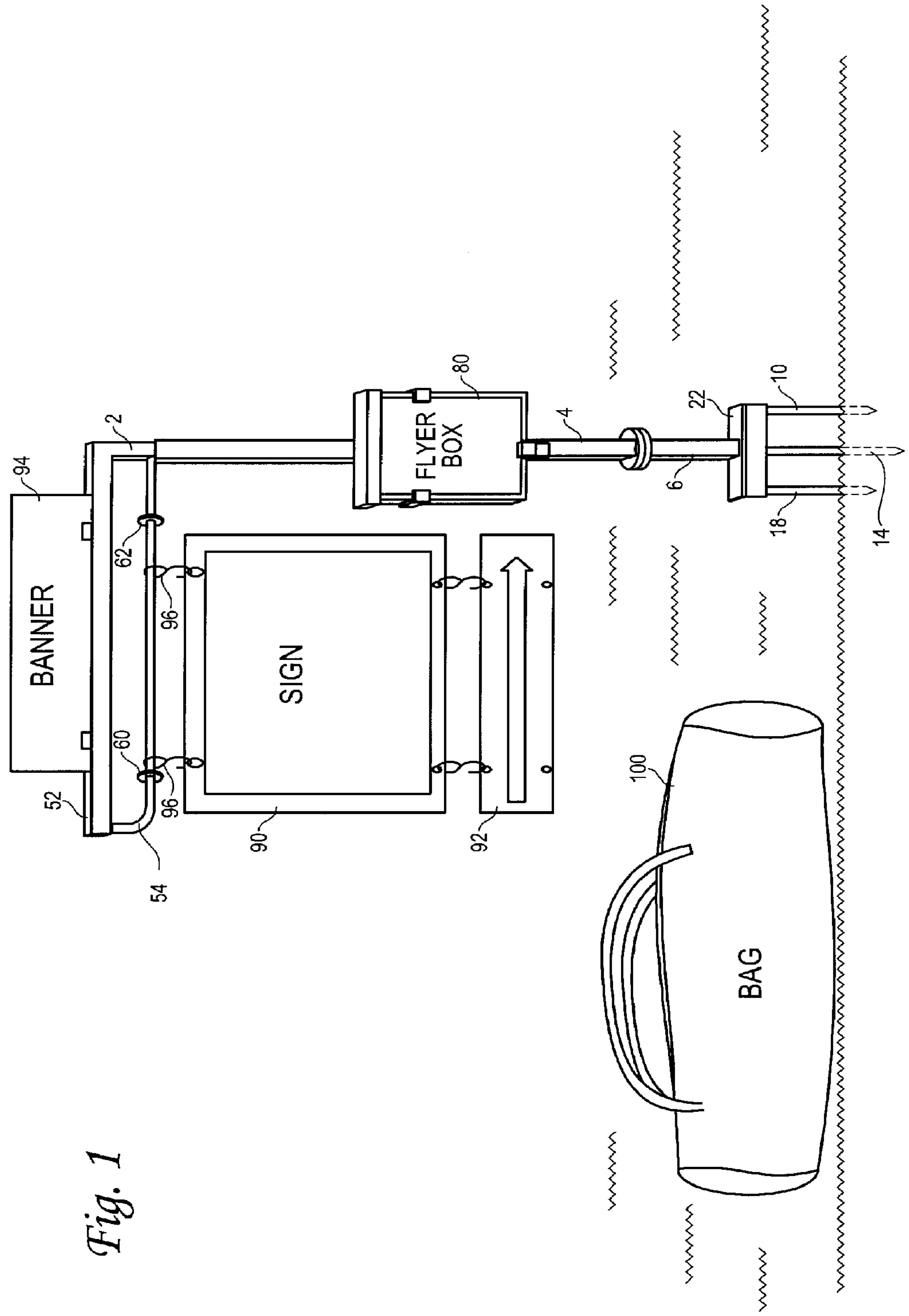
FIG. 1 shows a front view of a modular sign post embodiment.

With reference to FIG. 1, an assembled modular sign is shown. This view shows a first sign section 6 having stakes 10, 14, 18, which extend from base plate 22 mounted into the ground. Fitting onto first sign section 6 is second sign section 4. Mounted on second sign section 4 is a flyer box 80. Mounted atop second sign section 4 is a third sign section 2. Extending horizontally from a vertical post on second section 2 is a upper horizontal arm 52 and a lower horizontal arm 54. Hanging from lower horizontal arm 54 between drift stops, 62 are signs held by S-hooks 96. The S-hooks are preferred to have large throat openings on the sign hanging end for easier insertion into the sign holes. On the end that hooks over the lower horizontal arm 54, the S-hook may be crimped to permanently attach the S-hook to lower horizontal arm 54. This prevents the sign from blowing off in the wind, the hook being lost in post disassembly, etc. The sign 90 may include a lower sign 92 also attached by S-hooks or by other means. At the top of upper horizontal arm 52 is a banner sign 94. Banner sign is attached to in-line tabs, as explained in conjunction with FIG. 2.

Figure 2:
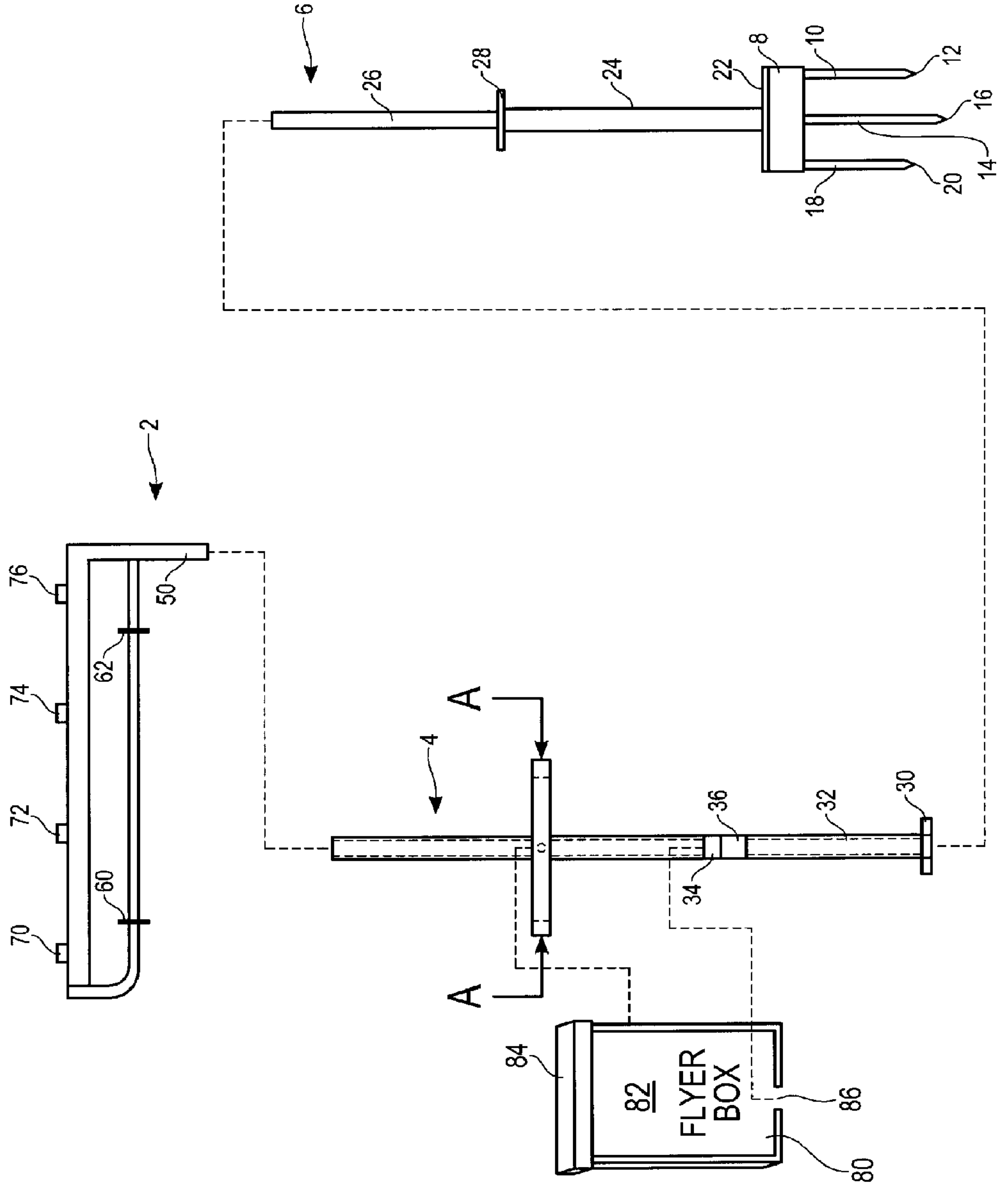
FIG. 2 is an exploded view of the three sections of a modular sign post embodiment.

Greater detail of the illustrated embodiment is shown in the exploded view of FIG. 2. This view shows the first sign section 6 before insertion of the second sign section 4 and third side section 2. First sign section 6 includes a base plate 22. This base plate may be designed to be rectangular and have sufficient width (such as 8 inches) to allow a user to place a foot on one side of the base plate. This width also allows a space for separations of the stakes mounted on the under side of base plate 22. In one embodiment, also mounted on the underside of base plate 22 is stability plate 8. This plate allows the stakes to remain with a gap from the ground of one inch or more. Stakes 10, 12, 14 are each welded to the stability plate. This prevents the stakes from bonding or splaying as the device is driven into the ground. Each of stakes 10, 12, 14 have a respective associated pointed tip 12, 16, 20 allowing the stakes to more easily be driven into the ground. Center stake 14 is an inch or two longer than side stakes 10, 18. This may prove advantageous when driving the first sign section 6 into the ground. Instead of requiring all three stakes to be driven into the ground at once, the longer, central stake may be initially driven into the ground. The first sign section 6 may then be straightened if the section was tipping or tilted. The side stakes may then be driven into the ground. In one embodiment, the center stake 14 is twelve inches long and the side stakes 10, 14 are each ten inches long.

Affixed to the opposite side of base plate 22 is base tube 24. This tube may be cylindrical or have a square, rectangular or other shape cross section. In one embodiment, the parts of the device are all steel allowing the base tube section to be welded onto base plate 22. Mounted within base tube 24 is guide tube 26. In the illustrated embodiment guide tube 26 extends into the interior bore of base tube 24 all the way to base plate 22. Guide tube 26 is welded onto base plate 22. It should also be possible to weld guide tube 26 onto base tube 24. Another embodiments, material costs may be saved if guide tube 26 and base tube 24 are made as a single integrated part. In addition if guide tube 26 were attached to base tube 24 at the open end of base tube 24 some material would be saved. Affixed onto the top of base tube 24 is driving stop collar 28. Driving stop collar 28 may be welded onto base tube 24. If base tube 24 has a square or rectangular cross section driving stop collar 28 may be welded onto the four sides along the bottom edge of driving stop collar 28 to the top edges of the top sides of base tube 24.

Fitting onto guide tube 26 is body tube 32 on second sign section 4. At a first end of the body tube 32 is attached driving collar 30.

To drive the first sign section 6 into the ground, second sign section 4 is placed over first sign section 6 (as indicated by dashed lines) and rapidly moving second sign section 4 up and down such that body tube 32 slides over guide tube 26. The downward motion of body tube 32 would be arrested as driving collar 30 on body tube 32 strikes driving stop collar 28 on base tube 24. This would transfer the driving force to base tube 24 and onto base plate 22, driving center stake 14 into the ground, and subsequently driving side stakes 10, 18 into the ground.

Mounted on body tube 32 is a flyer box clip 34 mounted by flyer box clip mount 36 onto body tube 32. Flyer box clip 34 allows clipping of flyer box 80 to secure this box onto body tube 32.

Figure 3:
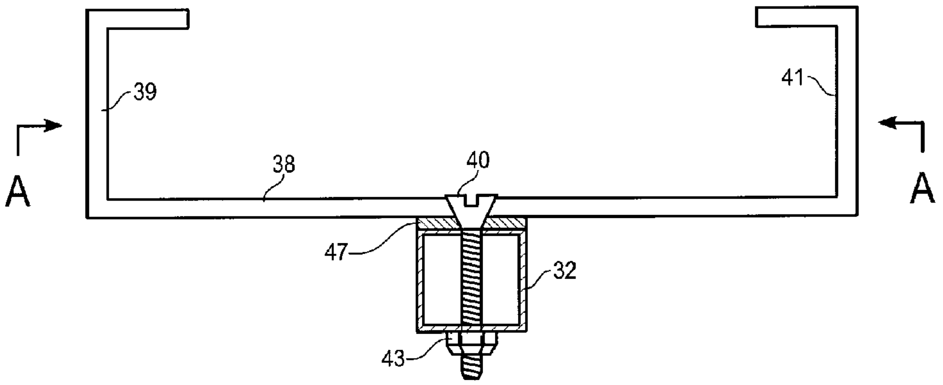
FIG. 3 is a cross-section of the rotating flyer box clip.

Holding the sides of flyer box 80 is a rotating bar 38. With reference to FIG. 3, the rotating bar 38 is shown in cross section as mounted on body tube 32. Rotating bar 38 is mounted on body tube 32 by bolts 40 which extends through body tube 32. The opposite threaded end of bolt 40 is secured by nut 43. In one embodiment, a washer 47 is positioned between rotating bar 38 and body tube 32. Bolt 40 extends through a hole in rotating bar 38, through the washer 37, through body tube 32 and is secured by nut 43. Both nut 43 and washer 47 may be nylon. Washer 47 prevents metal rotating bar 38 from scraping against metal body tube 32. On the sides of rotating bar 38 are return strap 39, 41. This configuration allows a flyer box to be mounted on the portable sign device by simply slipping the sign box into the area between return straps 39, 41.

Returning to FIG. 2, the bottom of the flyer box 80 would be held by flyer box clip 34. Flyer box 80 has sides that would be held by return straps 39, 41 which press against the flyer box cover 82 of flyer box 80. The flyers could be accessed by raising flyer box flap 84. Flyer box flap 84 prevents rain or insects from entering the interior of flyer box 80. Flyer box bottom contact 86 is used to secure flyer box 80 to flyer box clip 34.

Into the second opening (open end 42 on body tube 32) a vertical tube 50 of the third sign section 2 is placed. Vertical tube 50 includes a section that slidably fits into open end 42 body tube 32. Mounted onto and extending from vertical tube 50 is an upper horizontal arm 52 and a lower horizontal arm 54. These arms may be attached to the vertical tube 50 by welding, bolts, or any other attachment means to form a single third sign section 2. This third sign section 2 may once manufactured, be assembled onto the modular arm sign post by simple insertion of vertical tube 50 into body tube 32. No tool or bolts are required to attach third sign section 2 to second sign section 4. The upper horizontal arm 52 may be affixed at a right angle to vertical tube 50. The lower horizontal arm 54 is attached at a first end about half way down the length of vertical tube 50. The second end of lower horizontal arm 54 in this embodiment bends allowing attachment to upper horizontal arm 52 at the end of upper horizontal arm 52. Although a short section of lower horizontal arm 54 is vertical to allow attachment to upper horizontal arm 52, or over 80% of the length of the lower horizontal arm 52 is horizontal. The arm is substantially horizontal and substantially perpendicular to vertical tube 50 and for the present purposes would be considered substantially horizontal. Affixed to lower horizontal arm 54 is a first drift stop 60 and second drift stop 62. Each of the drift stops are several inches from the horizontal section of lower horizontal arm 54 and the attachment of lower horizontal 54 to vertical tube 50, respectively. These drift stops act to constrain the movement of the sign as discussed with respect to FIG. 1.

Attached to the top of upper horizontal arm 52 are a plurality of sign tabs 70, 72, 74, 76. In one embodiment, these sign tabs are mounted in line. A banner-type sign as shown in FIG. 1 may then be slightly bent to weave between these sign tabs.

It is preferred that the present device be manufactured from steel. Other materials, including other metals and plastics, may be adaptable for modular signs. However, the driving installation of the present device makes steel preferable. The device may be relatively simply manufactured by welding together various component parts. The device may be painted as with a powder coating to create an attractive look, inhibit rust, and make the product long lasting.

In the illustrated embodiment, the base tube 24, guide tube 26, body tube 32 and vertical tube 50 all have a square cross section. It could be possible to use round cross sections and include a means for preventing the first sign section from rotating on the second sign section and the second sign section from rotating on the third sign section. For example, wind on the sign hanging from the modular signpost will create a torque force that will cause the sign sections to want to rotate.

This could include a mechanical means, such as a pin or bolt extending through the sections, or could be a magnet or other means. However it is preferred that the cross section of teach tube include at least one faceted side. In the illustrated embodiment, the tubes are square in cross section. Rectangular cross-sections, other polygons, or a roughly cylindrical shape having one arc section having a facet on one arc section could also be used.

The use of a steel driving collar and a steel stop collar allow transfer of force to drive in the base device without flaring or deforming the base tube. The second sign section is used as a force-transferring device, like a pile driver. This section thus acts both as part of the modular sign device and as the tool for installing the device, in conjunction with the guide tube.

Each of the first sign section, the second sign section and the third sign section are about three feet long. This allows the three sections to be assembled by most users, fit into a bag 100 shown in FIG. 1. If the hanging sign and banner sign are not counted, the entire modular arm sign post is only three parts. Each of the three sign sections are about three feet long and no wider than eight inches in the illustrated embodiment. The entire device (with bag 100) weighs about 20 pounds. Several could fit into the trunk of a car. A single user could rapidly install and assemble the sign, removing the need for a professional installer. The sign does not have small parts that could be misplaced or break. The smallest part of the sign that is an independent part is the flyer box. No tools are required for the installation of this modular sign post.

What is claimed is:

1. A modular sign post comprising:

a first sign section including:

a base plate;

a plurality of stakes extending from a first side of said base plate;

a base tube mounted at a first base tube end onto a second side of said base plate;

a guide tube fixedly mounted within said base tube for a portion of a length of said guide tube, said guide tube longer than said base tube and extending from said base tube for at least one foot;

a driving stop collar mounted at a second base tube end;

a second sign section including;

a body tube, wherein cross sectional dimensions of an interior of said body tube allow said guide tube to slidably fit into said body tube;

a driving collar mounted at a first body tube end;

a flyer box retaining structure attached to said body tube;

a third sign section including:

a top vertical tube having a cross sectional dimension allowing said top vertical tube to be mounted into a second body tube end;

an upper horizontal arm connecting to said top vertical tube at an upper vertical tube portion; and a lower horizontal arm joined at a first lower horizontal arm end to a lower portion of said top vertical tube and at a second lower horizontal arm end to the upper horizontal arm; wherein said upper horizontal arm and said lower horizontal arm are parallel for a majority of the length of the lower horizontal arm and the upper horizontal arm and said lower horizontal arm bends to join said upper horizontal arm.

2. The modular sign post of claim 1, further includes a stability plate mounted on said base plate.

3. The modular sign post of claim 1, wherein said plurality of stakes includes three stakes.

4. The modular sign post of claim 3, wherein said three stakes include a longer center stake flanked by two side stakes.

5. The modular sign post of claim 1, wherein said flyer box retaining structure includes a rotatably attached flyer box retaining bar.

6. The modular sign post of claim 1, further including two drift stops fixedly mounted on said lower horizontal arm.

7. The modular sign post of claim 1, further including a plurality of inline sign tabs mounted on an upper surface of said upper horizontal arm.

* * * * *